(12) United States Patent
Hu et al.

(10) Patent No.: US 12,250,461 B2
(45) Date of Patent: Mar. 11, 2025

(54) IMAGE CONTROLLER, IMAGE PROCESSING SYSTEM AND IMAGE CORRECTING METHOD

(71) Applicant: GENESYS LOGIC, INC., New Taipei (TW)

(72) Inventors: Shi-Ming Hu, New Taipei (TW); Hsueh-Te Chao, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 303 days.

(21) Appl. No.: 17/834,924

(22) Filed: Jun. 7, 2022

(65) Prior Publication Data

US 2023/0007182 A1 Jan. 5, 2023

Related U.S. Application Data

(60) Provisional application No. 63/217,770, filed on Jul. 2, 2021.

(30) Foreign Application Priority Data

Oct. 19, 2021 (TW) .................................. 110138713

(51) Int. Cl.
*H04N 23/69* (2023.01)
(52) U.S. Cl.
CPC .................................. *H04N 23/69* (2023.01)
(58) Field of Classification Search
CPC ...... H04N 23/69; H04N 23/66; H04N 23/698; H04N 23/611; H04N 5/2628; G06T 3/047; G06T 5/80; G06T 7/73; G06T 2207/10016; G06T 2207/30196; G06T 7/20

See application file for complete search history.

(56) References Cited

U.S. PATENT DOCUMENTS

| | | | | |
|---|---|---|---|---|
| 7,268,803 | B1* | 9/2007 | Murata | H04N 13/10 |
| | | | | 348/E13.064 |
| 9,609,181 | B2* | 3/2017 | Wang | H04N 23/698 |
| 10,186,301 | B1* | 1/2019 | van Hoff | H04N 13/271 |

(Continued)

FOREIGN PATENT DOCUMENTS

| | | |
|---|---|---|
| CN | 102479379 | 5/2012 |
| CN | 108154171 | 6/2018 |

(Continued)

OTHER PUBLICATIONS

"Office Action of Taiwan Counterpart Application", issued on Mar. 16, 2023, p. 1-p. 14.

*Primary Examiner* — Chiawei Chen
(74) *Attorney, Agent, or Firm* — JCIPRNET

(57) ABSTRACT

An image controller, an image processing system, and an image correcting method are provided. A first controller obtains a first image from an image capturing apparatus. The first controller converts the first image into a second image according to a converting operation. The converting operation includes deformation correction, and the deformation correction is used to correct deformation of one or more target objects in the first image. A second controller detects the target object in the second image to generate a detected result. The first controller corrects the converting operation according to the detected result. A visual experience may thus be improved in this way.

21 Claims, 16 Drawing Sheets

FOV5　　　FOV6　　　FOV7

(56) References Cited

U.S. PATENT DOCUMENTS

| | | | | |
|---|---|---|---|---|
| 10,547,849 B1* | 1/2020 | Bellows | ................... | G06T 5/80 |
| 11,037,327 B2* | 6/2021 | Hirai | ......................... | G06T 7/80 |
| 11,210,859 B1* | 12/2021 | Fredericks | ................ | G06T 7/62 |
| 11,290,638 B1* | 3/2022 | Duffy | ........................ | G06T 7/73 |
| 2011/0128385 A1* | 6/2011 | Bedros | ................... | H04N 7/181 |
| | | | | 348/240.99 |
| 2011/0216157 A1* | 9/2011 | Bigioi | ....................... | G06T 5/80 |
| | | | | 348/36 |
| 2011/0249153 A1* | 10/2011 | Hirooka | ................. | H04N 5/272 |
| | | | | 348/241 |
| 2013/0265383 A1* | 10/2013 | Yamashita | ........... | G06V 40/161 |
| | | | | 348/14.08 |
| 2016/0277712 A1* | 9/2016 | Michot | ..................... | G06T 7/20 |
| 2017/0330337 A1* | 11/2017 | Mizutani | ................... | G06T 5/50 |
| 2018/0063482 A1* | 3/2018 | Goesnar | ................. | H04N 23/58 |
| 2019/0354780 A1* | 11/2019 | Ueno | ........................ | G06T 5/70 |
| 2021/0110142 A1 | 4/2021 | Shih et al. | | |
| 2021/0289134 A1* | 9/2021 | Athreya | ................ | G06T 3/4038 |
| 2022/0270216 A1* | 8/2022 | Wang | ........................ | G06T 5/80 |

FOREIGN PATENT DOCUMENTS

| | | |
|---|---|---|
| TW | 201824178 | 7/2018 |
| TW | 202123081 | 6/2021 |

\* cited by examiner

FIM1　　　　　　　　　SIM1

FIM1

SIM16

SIM17

SIM18

SIM24

SIM25

SIM27

SIM28

IMAGE CONTROLLER, IMAGE PROCESSING SYSTEM AND IMAGE CORRECTING METHOD

CROSS-REFERENCE TO RELATED APPLICATION

This application claims the priority benefit of U.S. provisional application Ser. No. 63/217,770, filed on Jul. 2, 2021 and Taiwan application Ser. No. 110138713, filed on Oct. 19, 2021. The entirety of each of the above-mentioned patent applications is hereby incorporated by reference herein and made a part of this specification.

BACKGROUND

Technical Field

The disclosure relates to an image processing technology, and in particular, to an image controller, an image processing system, and an image correcting method.

Description of Related Art

In the related art, although a camera equipped with a wide-angle lens or a fisheye lens may be used to capture an image with a wide field of view (FoV), the edges of the image may be curved and an unnatural appearance may be provided. Distortion of a wide-angle or fisheye image may make its content difficult to recognize, and may cause discomfort to the user's eyes.

Moreover, such cameras are usually installed in products such as rear-view mirrors, IP cameras, surveillance systems, IoT cameras, and machine vision-related products. In some application scenarios, the object in the image is the target that the viewer would like to track. However, there may be more than one object in the image and the object may move, but such products generally cannot provide a suitable image in response to the movement or the number of objects.

SUMMARY

In view of the above, the embodiments of the disclosure provide an image controller, an image processing system, and an image correcting method through which a distorted image may be easily and effectively corrected, and recognition of a specific tracking target in the image may be improved.

An embodiment of the disclosure provides an image correcting method including (but not limited to) the following steps. A first image from an image capturing apparatus is obtained. The first image is converted into a second image according to a converting operation. The converting operation includes deformation correction, and the deformation correction is used to correct deformation of one or more target objects in the first image. The target object in the second image is detected to generate a detected result. The converting operation is corrected according to the detected result.

An embodiment of the disclosure further provides an image processing system including (but not limited to) an image capturing apparatus, a first controller, and a second controller. The image capturing apparatus includes a lens and an image sensor. A first image may be captured through the lens and the image sensor. The first controller is coupled to the image capturing apparatus and is configured to convert the first image into a second image according to a converting operation. The converting operation includes distortion correction. The distortion correction is used to correct deformation of one or more target objects in the first image. The second controller is coupled to the first controller and is configured to detect the target objects in the second image to generate a detected result. The first controller if further configured to correct the converting operation according to the detected result.

An embodiment of the disclosure further provides an image controller including (but not limited to) a memory and a processor. The memory is configured to store a program code. The processor is coupled to the memory. The processor is configured to load and execute the program code to obtain a first image, convert the first image into a second image according to a converting operation, detect one or more target objects in the second image to generate a detected result, and correct the converting operation according to the detected result. The converting operation includes deformation correction, and the deformation correction is used to correct deformation of one or more target objects in the first image.

To sum up, in the image controller, the image processing system, and the image correcting method provided by the embodiments of the disclosure, the converting operation of the first controller is mainly corrected according to the detected result of the second controller for the target object. In this way, the distortion may be corrected and the target object may be highlighted in the second image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
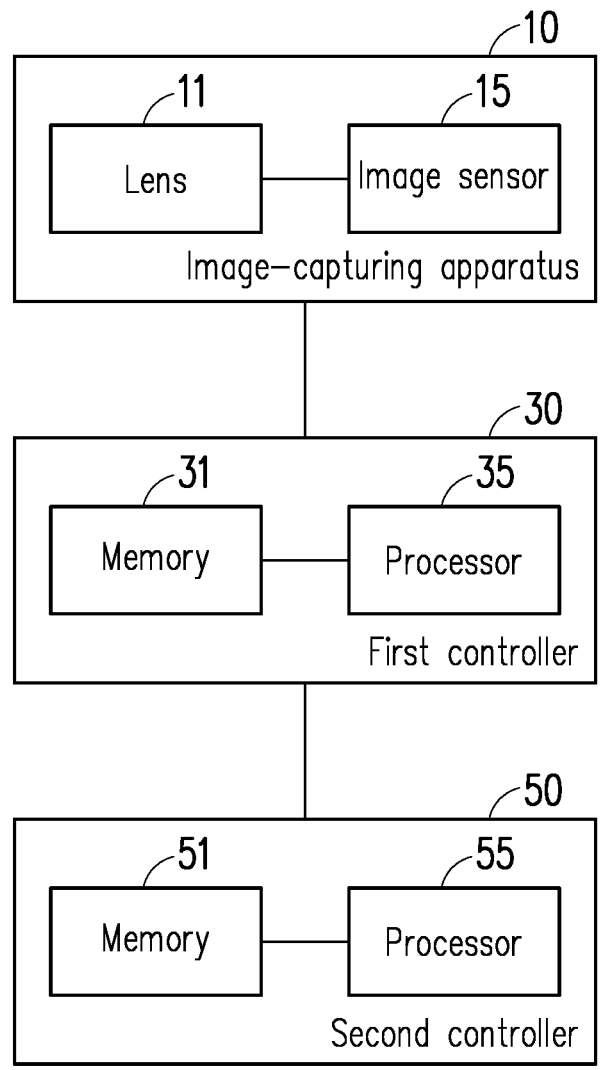
FIG. 1 is a block view of devices in an image processing system according to an embodiment of the disclosure.

FIG. 1 is a block view of devices in an image processing system 1 according to an embodiment of the disclosure. With reference to FIG. 1, the image processing system 1 includes (but not limited to) an image capturing apparatus 10, a first controller 30, and a second controller 50.

The image capturing apparatus 10 may be a camera, a video camera, a monitor, or an apparatus featuring similar functions. The image capturing apparatus 10 may include (but not limited to) a lens 11 and an image sensor 15 (e.g., a charge coupled device (CCD) or a complementary metal-oxide-semiconductor (CMOS), etc.). In an embodiment, an image may be captured through the lens 11 and the image sensor 15. For instance, light may be imaged on the image sensor 15 through the lens 11.

In some embodiments, specifications of the image capturing apparatus 10 (e.g., imaging aperture, magnification, focal length, imaging viewing angle, size of the image sensor 15, etc.) and a number thereof may be adjusted according to actual needs. For instance, the lens 11 is a fisheye or wide-angle lens and generates a fisheye image or a wide-angle image accordingly.

The first controller 30 may be coupled to the image capturing apparatus 10 through a camera interface, I2C, and/or other transmission interfaces. The first controller 30 includes (but not limited to) a memory 31 and a processor 35. The memory 31 may be a fixed or movable random access memory (RAM) in any form, a read only memory (ROM), a flash memory, a hard disk drive (HDD), a solid-state drive (SSD), or other similar devices. In an embodiment, the memory 31 is used to store a program code, a software module, a configuration, data, or a file. The processor 35 may be an image processor, a graphic processing unit (GPU), or a programmable microprocessor for general or special use, a digital signal processor (DSP), a programmable controller, a field programmable gate array (FPGA), an application-specific integrated circuit (ASIC), other similar devices, or a combination of the foregoing devices. In an embodiment, the processor 35 is configured to execute all or part of the operations of the first controller 30 and may load and execute various program codes, software modules, files, and data stored in the memory 31.

The second controller 50 may be coupled to the first controller 30 through a camera interface (e.g., mobile industry processor interface (MIPI)), I2C, USB, and/or other transmission interfaces. The second controller 50 includes (but not limited to) a memory 51 and a processor 55. Implementation and functions of the memory 51 may be found with reference to the description of the memory 31, which is not to be repeated herein. Implementation and functions of the processor 55 may be found with reference to the description of the processor 35, which is not to be repeated herein. In an embodiment, the processor 55 is configured to execute all or part of the operations of the second controller 50 and may load and execute various program codes, software modules, files, and data stored in the memory 51.

In an embodiment, the image capturing apparatus 10, the first controller 30, and the second controller 50 may be integrated into an independent apparatus. For instance, the image processing system 1 is a camera system, where the first controller 30 may be a fisheye controller, a wide-angle lens controller, or other image-related controllers, and the second controller 50 is a microcontroller or an SoC. In another embodiment, the image capturing apparatus 10 and the first controller 30 may be integrated into a module, and the second controller 50 is, for example, a computer system (e.g., a desktop computer, a notebook computer, a server, a smartphone, or a tablet computer) or a part thereof. In still another embodiment, the first controller 30 and the second controller 50 may be integrated into an image controller or an appropriate controller module and may be coupled to the image capturing apparatus 10.

In the following paragraphs, a method provided by the embodiments of the disclosure is described together with the various apparatuses, devices, and modules in the image processing system 1. The steps of the method may be adjusted according to actual implementation and are not limited by the disclosure.

Figure 2:
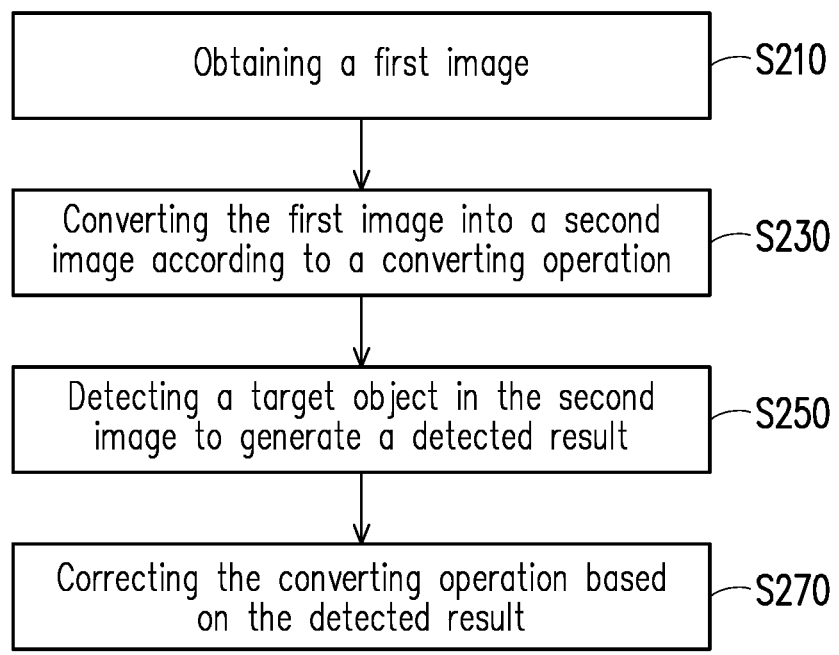
FIG. 2 is a flow chart of an image correcting method according to an embodiment of the disclosure.

FIG. 2 is a flow chart of an image correcting method according to an embodiment of the disclosure. With reference to FIG. 2, the first controller 30 obtains a first image from the image capturing apparatus 10 (step S210). To be specific, the first image is an image captured by the image capturing apparatus 10 or other external image capturing apparatuses on one or more target objects. In an embodiment, the target object is, for example, a human body. In some embodiments, the first image may also be for the upper body (e.g., the waist, shoulders, or above the chest) of a human. In other embodiments, the target object may also be various types of organisms or non-living organisms. The first controller 30 may obtain the first image captured by the image capturing apparatus 10 via the camera interface and/or I2C.

The first controller 30 may convert the first image into a second image according to a converting operation (step S230). To be specific, in an embodiment, the converting operation comprises distortion correction. The distortion correction is used to correct deformation of one or more target objects in the first image. In another embodiment, the converting operation includes position adjustment. The position adjustment is used to correct a position or positions of one or more target objects in the first image. In still another embodiment, the converting operation includes distortion correction and position adjustment. That is, appearance and/or a position of the target object in the first image may be different from that of the same target object in the second image.

Figure 3A:
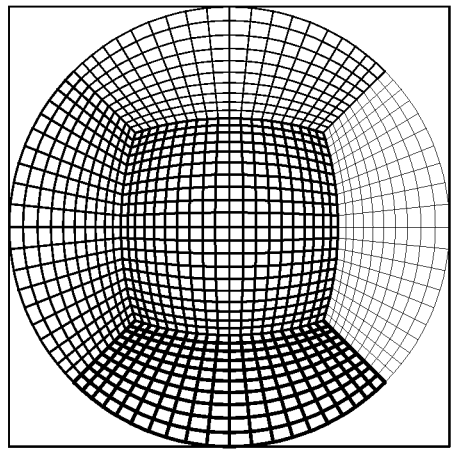
FIG. 3A is a schematic picture of dewarping according to an embodiment of the disclosure.
Figure 3A:
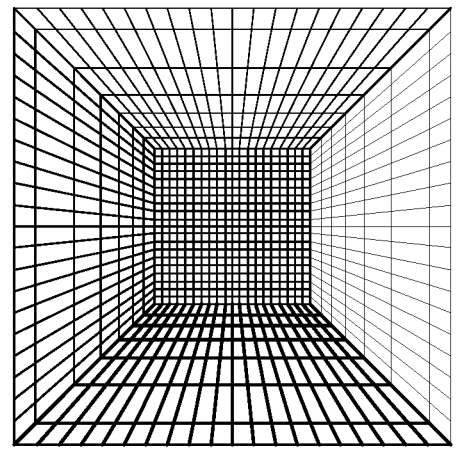

For instance, FIG. 3A illustrates schematic pictures of dewarping according to an embodiment of the disclosure. With reference to FIG. 3A, in this embodiment, the distortion correction is, for example, dewarping processing, and a first image FIM1 is, for example, an image obtained through a fisheye lens, and the image is, for example, a warped image. The first controller 30 may perform a converting operation, such as dewarping and unfolding, on the first image FIM1 to generate a second image SIM1, so that the second image SIM1 is closer to the real image. In this way, a target object image with a better ratio or a normal ratio may be generated.

Figure 3B:
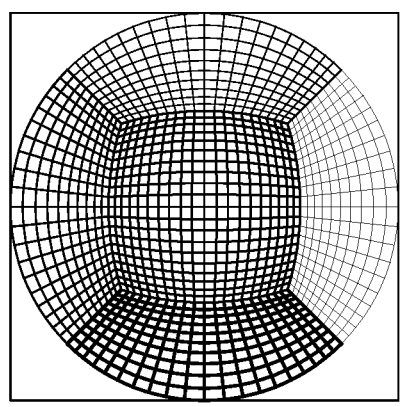
FIG. 3B is a schematic picture of field of view (FoV) adjustment according to an embodiment of the disclosure.
Figure 3B:
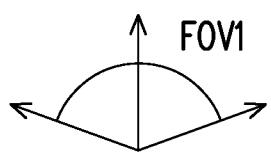
Figure 3B:
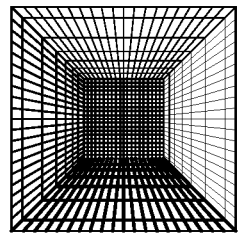
Figure 3B:
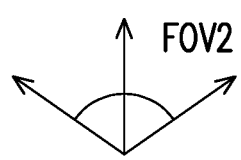
Figure 3B:
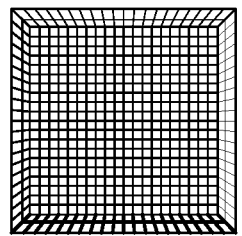

In some application scenarios, in order to adapt to a size (e.g., resolution of 1920×1080 or 480×272) or a ratio (e.g., 16:9 or 4:3) of a display apparatus, an imaging field of view (FoV) of the image may be adjusted. FIG. 3B is a schematic picture of FoV adjustment according to an embodiment of the disclosure. With reference to FIG. 3B, in this embodiment, the position adjustment included in the converting operation is, for example, FoV adjustment, and an imaging FoV of the lens 11 of the image capturing apparatus 10 is, for example, 180 degrees. Herein, the first controller 30 of this embodiment may, for example, change or adjust the imaging FoV of the first image FIM1 to become a FoV of FOV1 (e.g., 140 degrees) (i.e., the converting operation) to generate a second image SIM2. Alternatively, the first controller 30 may change the imaging FoV of the first image FIM1 to become a FoV of FOV2 (e.g., 110 degrees) (i.e., the converting operation) to generate a second image SIM3. In this way, the imaging FoV may be directed towards the target object at a specific position in front of the lens 11.

Figure 3C:
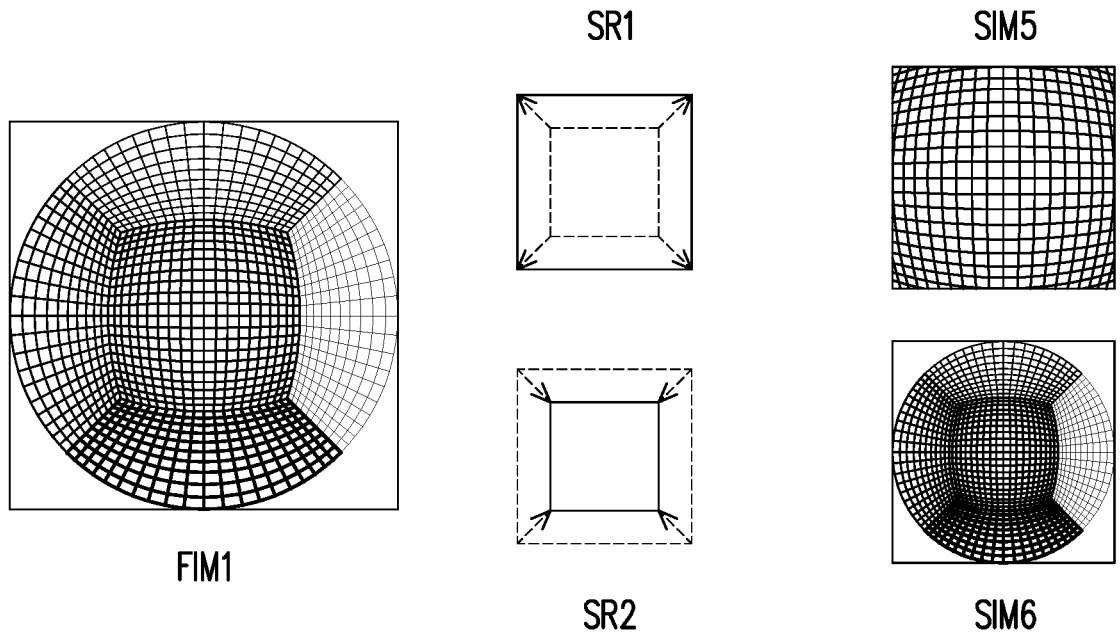
FIG. 3C is a schematic picture of zoom adjustment according to an embodiment of the disclosure.

In some application scenarios, the image processing application is required to perform image zooming. For example, if the image is insufficient for image recognition, the image needs to be zoomed in. Besides, zooming in the image may cause the imaging FoV to be relatively narrowed. If an original size image is intended for viewing, the imaging FoV may be restored by zooming out the image. FIG. 3C is a schematic picture of zoom adjustment according to an embodiment of the disclosure. With reference to FIG. 3C, in this embodiment, the converting operation may further include zooming adjustment. In this embodiment, the first image FIM1 may be zoomed in (i.e., the converting operation) according to a zoom magnification SR1 (e.g., 120%) to generate a second image SIMS. Alternatively, in this embodiment, the first image FIM1 may be zoomed out (i.e., the converting operation) according to a zoom magnification SR2 (e.g., 80%) to generate a second image SIM6. In this way, the target object may be zoomed in or zoomed out.

Figure 3D:
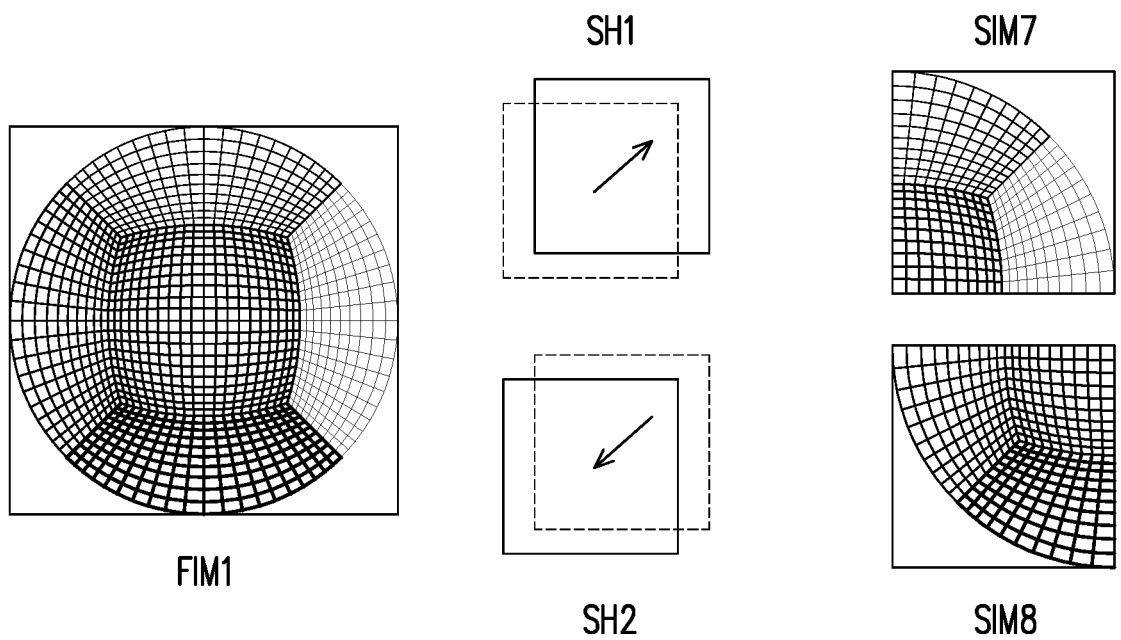
FIG. 3D is a schematic picture of shifting according to an embodiment of the disclosure.

In some application scenarios, after the image is zoomed in, an area beyond a visible range in the image may be browsed by shifting. FIG. 3D is a schematic picture of shifting according to an embodiment of the disclosure. With reference to FIG. 3D, in this embodiment, the position adjustment included in the converting operation is, for example, image shifting, and the dotted-line boxes in the drawing represent the visible range of the first image, and the solid-line boxes represent the visible range of the second image. The first controller 30 may, for example, notify the image capturing apparatus 10 that the first image FIM1 may be shifted (i.e., the converting operation) according to a direction SH1 (towards the upper right) to generate a second image SIM7. The first controller 30 may, for example, notify the image capturing apparatus 10 that the first image FIM1 may be shifted (i.e., the converting operation) according to a direction SH2 (towards the lower left) to generate a second image SIM8. In this way, the position of the target object in the image may be changed.

Figure 3E:
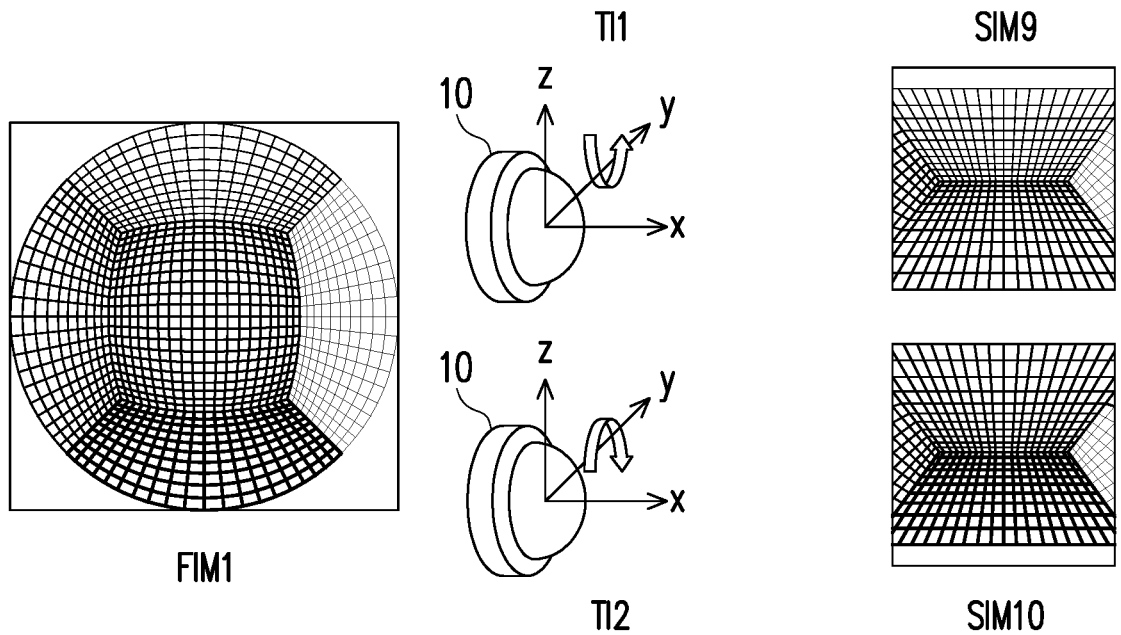
FIG. 3E is a schematic picture of upper and lower FoV adjustment according to an embodiment of the disclosure.

In some application scenarios, when an image of interest is located above or below the image capturing apparatus 10, an angle may be adjusted through upper and lower FoV adjustment (or referred to as tilting adjustment) to obtain an improved imaging FoV. For instance, when the image capturing apparatus 10 is integrated into an electronic doorbell and is mounted on a wall, a height of the image capturing apparatus 10 may be higher or lower than a person's standing height, so that the imaging FoV may be changed through upper and lower FoV adjustment. FIG. 3E is a schematic picture of upper and lower FoV adjustment according to an embodiment of the disclosure. With reference to FIG. 3E, in this embodiment, the position adjustment included in the converting operation is, for example, upper and lower FoV adjustment. The image capturing apparatus 10 is installed upright and faces a y axis. The first controller 30 may, for example, notify the image capturing apparatus 10 that the FoV of the first image FIM1 in TI1 may be adjusted upwards according to an axis x (i.e., the converting operation) to generate a second image SIM9. Alternatively, the first controller 30 may, for example, notify the image capturing apparatus 10 that the FoV of the first image FIM1 in TI2 may be adjusted downwards according to the axis x (i.e., the converting operation) to generate a second image SIM10. In this way, the position of the target object in the image may be changed.

Figure 3F:
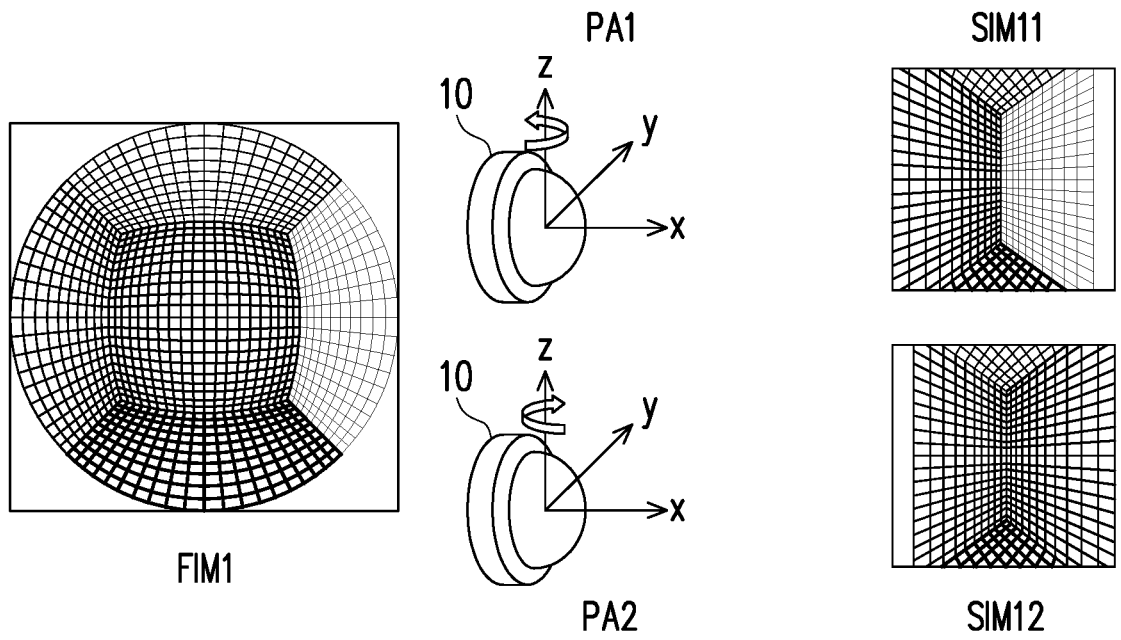
FIG. 3F is a schematic picture of left and right FoV adjustment according to an embodiment of the disclosure.

In some application scenarios, when the image of interest is located to the left or right of the image capturing apparatus 10, an angle may be adjusted through left and right FoV adjustment (or referred to as panning adjustment) to obtain an improved imaging FoV. For instance, when the image capturing apparatus 10 is integrated into an electronic doorbell and is mounted on a wall, the lens 11 may not face a visitor directly, so that the imaging FoV may be adjusted to face the visitor through panning adjustment. FIG. 3F is a schematic picture of left and right FoV adjustment according to an embodiment of the disclosure. With reference to FIG. 3F, the position adjustment included in the converting operation is, for example, left and right FoV adjustment (or referred to as panning adjustment). The image capturing apparatus 10 is installed upright and faces the y axis. The first controller 30 may, for example, notify the image capturing apparatus 10 that the FoV of the first image FIM1 in PA1 may be adjusted to the right according to an axis z (i.e., the converting operation) to generate a second image SIM11. Alternatively, the first controller 30 may, for example, notify the image capturing apparatus 10 that the FoV of the first image FIM1 in PA2 may be adjusted to the left according to the axis z (i.e., the converting operation) to generate a second image SIM12. In this way, the position of the target object in the image may be changed.

Figure 3G:
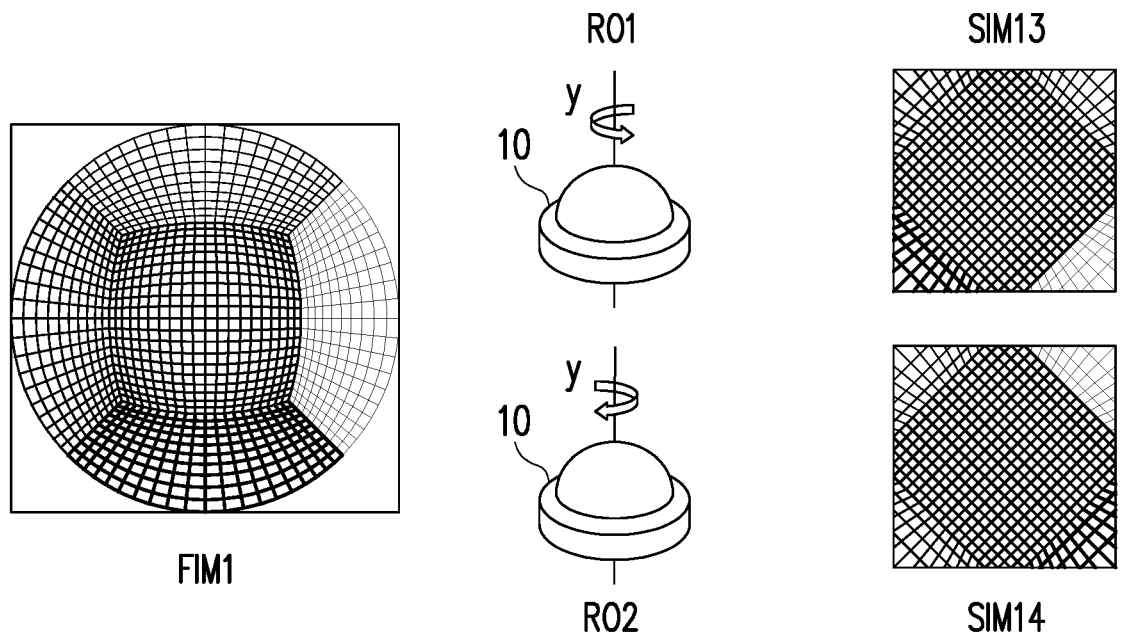
FIG. 3G is a schematic picture of plane FoV adjustment according to an embodiment of the disclosure.

FIG. 3G is a schematic picture of plane FoV adjustment according to an embodiment of the disclosure. With reference to FIG. 3G, the position adjustment included in the converting operation is, for example, plane FoV adjustment (or referred to as rotating). The image capturing apparatus 10 is laid flat and faces the y axis. The first controller 30 may, for example, notify the image capturing apparatus 10 that the FoV of the first image FIM1 in RO1 may be rotated clockwise according to the axis y (i.e., the converting operation) to generate a second image SIM13. Alternatively, the first controller 30 may, for example, notify the image capturing apparatus 10 that the FoV of the first image FIM1 in RO2 may be rotated counterclockwise according to the axis y (i.e., the converting operation) to generate a second image SIM14. In this way, the position of the target object in the image may be changed.

Figure 3H:
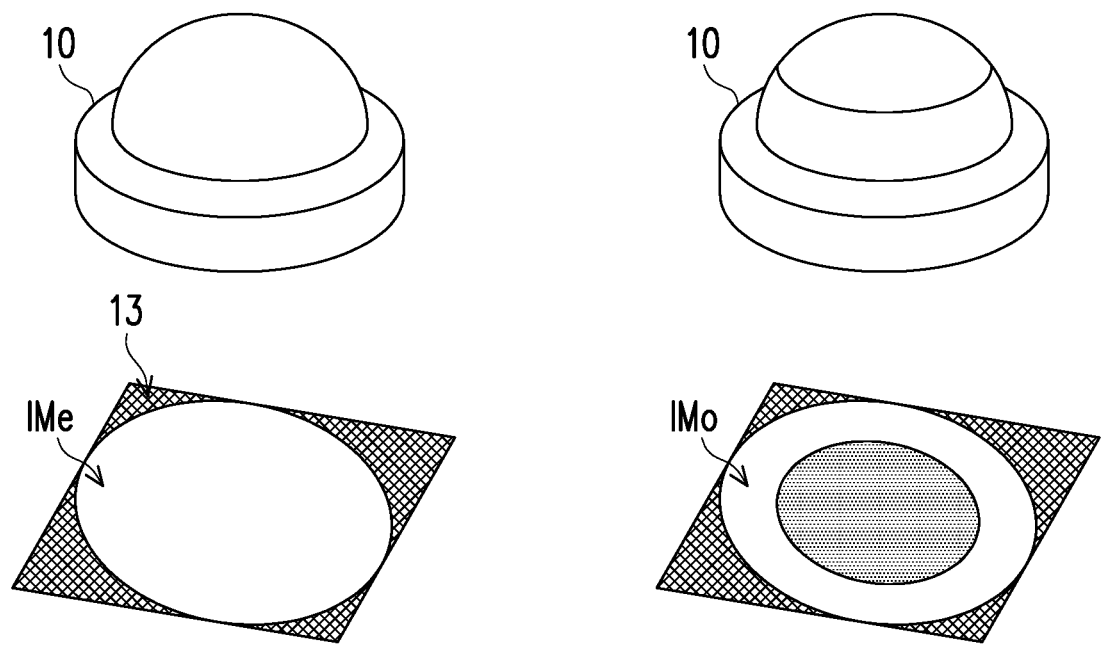
FIG. 3H is a schematic view of arrangement of an image capturing apparatus and captured images according to an embodiment of the disclosure.

Regarding the application scenario of plane FoV adjustment, FIG. 3H is a schematic view of arrangement of the image capturing apparatus 10 and captured images according to an embodiment of the disclosure. With reference to FIG. 3H, the image capturing apparatus 10 is placed in a horizontal position. It is assumed that the lens 11 is a fisheye lens, light passes through the lens 11 and is projected on the image sensor 13 to generate a fisheye image IMe. According to application needs, the first controller 30 may, for example, notify the image capturing apparatus 10 to capture only an outer ring image IMo corresponding to an outer ring of the lens 11.

Figure 3I:
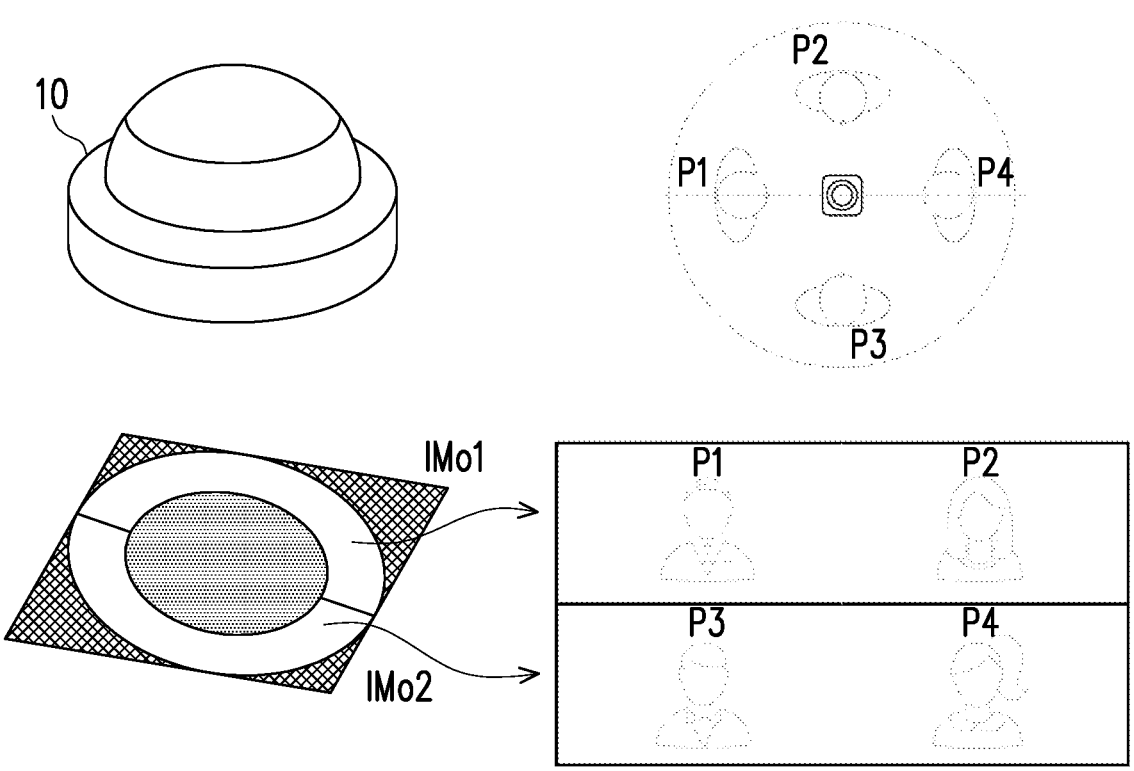
FIG. 3I is a schematic view of the arrangement of the image capturing apparatus and the captured images according to an embodiment of the disclosure.

FIG. 3I is a schematic view of the arrangement of the image capturing apparatus 10 and the captured images according to an embodiment of the disclosure. With reference to FIG. 3I, as shown in the upper half of the drawing, it is assumed that the image capturing apparatus 10 is placed among the figures P1, P2, P3, and P4 in a horizontal manner. If only the outer ring of the lens 11 is captured and is divided into two halves, outer ring images IMo1 and IMo2 may be generated. The outer ring image IMo1 captures the figures P1 and P2, and the outer ring image IMo2 captures the figures P3 and P4.

Figure 3J:
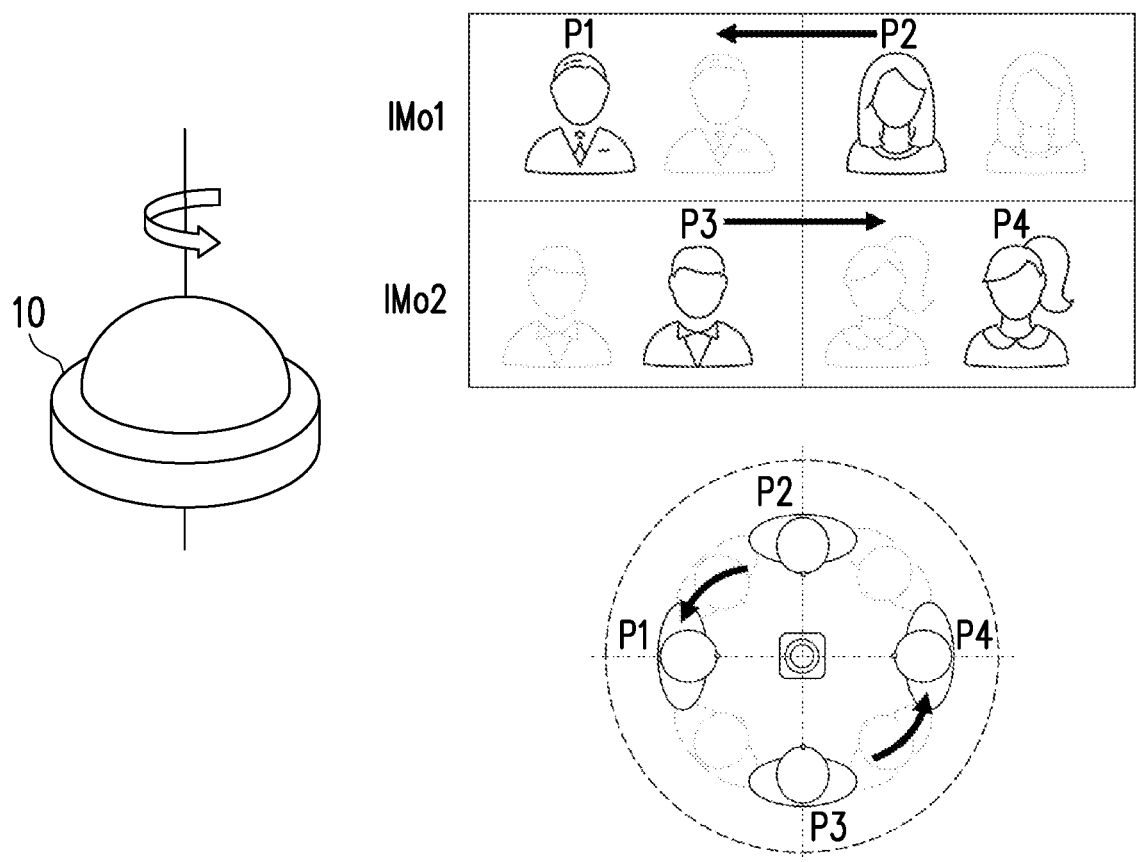
FIG. 3J is a schematic view of the arrangement of the image capturing apparatus and the captured images according to an embodiment of the disclosure.

FIG. 3J is a schematic view of the arrangement of the image capturing apparatus 10 and the captured images according to an embodiment of the disclosure. With reference to FIG. 3J, it is assumed that the first controller 30 performs plane FoV adjustment on the outer ring images IMo1 and IMo2 according to the direction of the arrow as shown in the left drawing. The figures P1 to P4 with light-colored lines shown in the drawing represent their original positions, and the figures P1 to P4 with dark-colored lines represent their positions after plane FoV adjustment is performed. The figures P1 and P2 captured by the outer ring image IMo1 are shifted to the left, and the figures P3 and P4 captured by the outer ring image IMo2 are shifted to the right.

Figure 4:
FIG. 4 is a schematic picture of an expanded fisheye image according to an embodiment of the disclosure.

FIG. 4 is a schematic picture of an expanded fisheye image according to an embodiment of the disclosure. With reference to FIG. 4, it is assumed that a first image FIM2 is a fisheye image, and figures in the image are deformed. A second image SIM15 is an image corrected by the first controller 30, and proportions of the figures in the image are normal.

In an embodiment, the converting operation further includes a target layout (or referred to as a window layout or a multi-way split window). The second image includes a plurality of windows, for example. In addition, it is assumed that the second image includes one or more target objects. For instance, a first target, a second target, a third target, and/or a fourth target are included. The target layout is used to adjust a target window (i.e., one of those windows) of the first target among these target objects in the second image. In this embodiment, the second image may be divided into a plurality of windows, the image after the deformation correction is cropped, and a cropped portion of the image is arranged in a specific window. In a preferred embodiment, an application is adopted to divide the second image into a plurality of windows in this embodiment.

Figure 5:
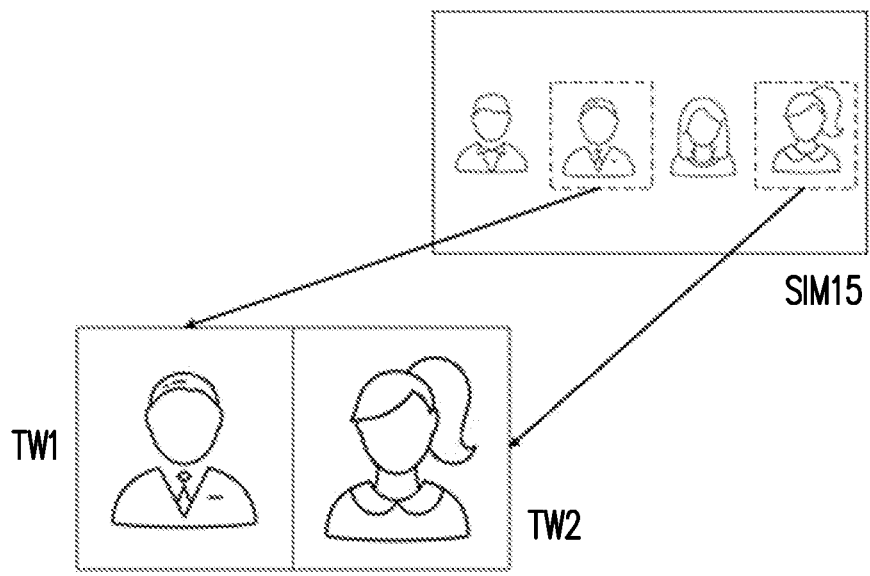
FIG. 5 is a schematic picture of a target layout according to an embodiment of the disclosure.

For instance, FIG. 5 is a schematic picture of a target layout according to an embodiment of the disclosure. With reference to FIG. 5, after the first controller 30 performs deformation correction on the first image FIM2 in FIG. 4, the zoomed and/or cropped images are arranged in different windows, for example, in TW1 and TW2. The images arranged in different windows TW1 and TW2 are, for example, images of people participating in a conference or images of participants who are specifically screened. The images of the participants who are specifically screened are, for example, the participants who speak in the conference.

Figure 6:
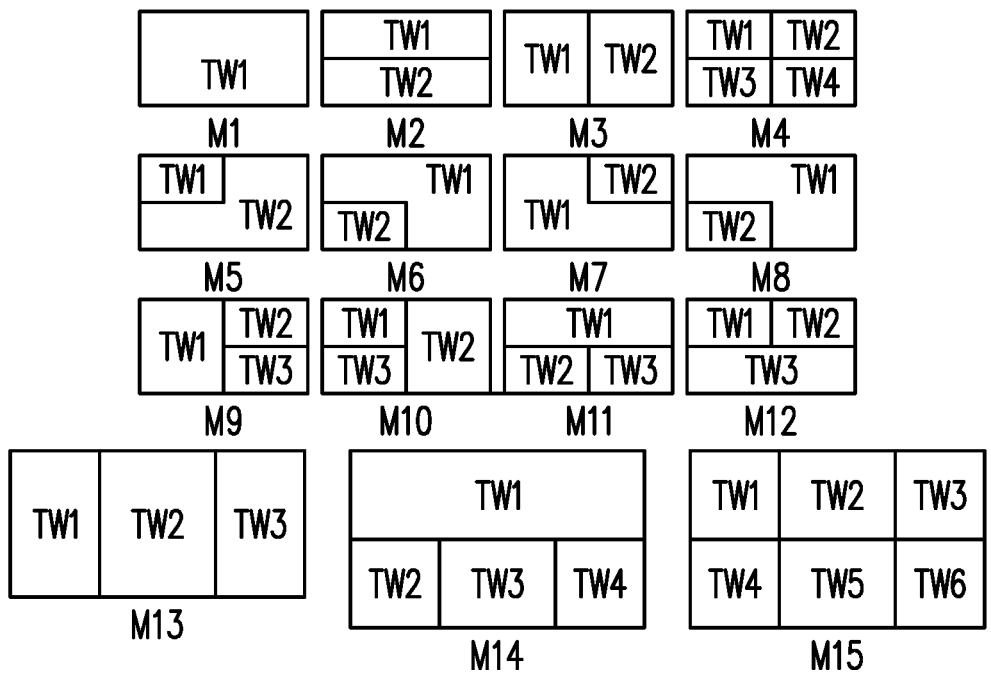
FIG. 6 is a schematic picture of target layouts in a plurality of modes according to an embodiment of the disclosure.

FIG. 6 is a schematic picture of target layouts in a plurality of modes M1 to M15 according to an embodiment of the disclosure. With reference to FIG. 6, these plurality of modes M1 to M15 may include one window TW1, two windows TW1 and TW2, three windows TW1 to TW3, four windows TW1 to TW4, five windows TW1 to TW5, or six windows TW1 to TW6. The dividing line in each mode M2 to M15 is the window range. TW1 to TW6 are configured to represent serial number of different windows. Furthermore, even though numbers of windows are the same in different targets, positions, sizes, and/or shapes of the windows may be different. For instance, the window TW1 in the mode M6 is larger than the window TW1 in the mode 2.

It should be noted that, the numbers, sizes, and shapes of the windows may be further changed, which are not limited in the embodiments of the disclosure. In addition, the symbols "TW1", "TW2", "TW3", "TW4", "TW5", and "TW6" are only used as serial numbers.

Three modes are given below as examples.

Figure 7A:
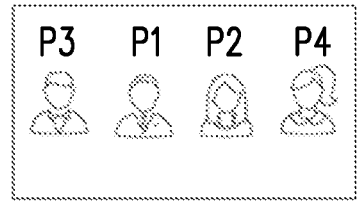
FIG. 7A is a schematic picture of a target layout in a mode according to an embodiment of the disclosure.

FIG. 7A is a schematic picture of a target layout in a mode according to an embodiment of the disclosure. With reference to FIG. 4, FIG. 6, and FIG. 7A, assuming that the first controller 30 selects the mode M1 in FIG. 6, the first image FIM2 in FIG. 4 may be converted into a second image SIM16 in FIG. 7A, where the second image SIM16 in FIG. 7A is, for example, a single-window mode.

Figure 7B:
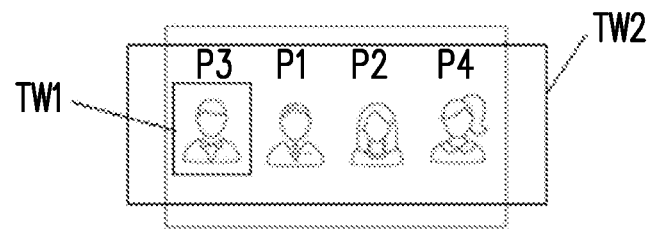
FIG. 7B is a schematic picture of a target layout in a mode according to an embodiment of the disclosure.
Figure 7B:
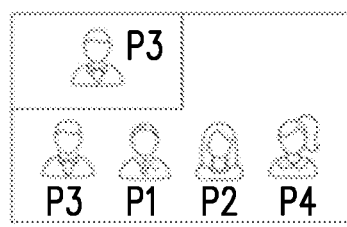

FIG. 7B is a schematic picture of a target layout in a mode according to an embodiment of the disclosure. With reference to FIG. 4, FIG. 6, and FIG. 7B, assuming that the first controller 30 selects the mode M5 in FIG. 6, the first image FIM2 in FIG. 4 may be converted into a second image SIM17 in FIG. 7B. The second image SIM17 in FIG. 7B is, for example, a two-way split window. The window TW1 is for the figure P3, and the window TW2 is for the four figures P1, P2, P3, and P4.

Figure 7C:
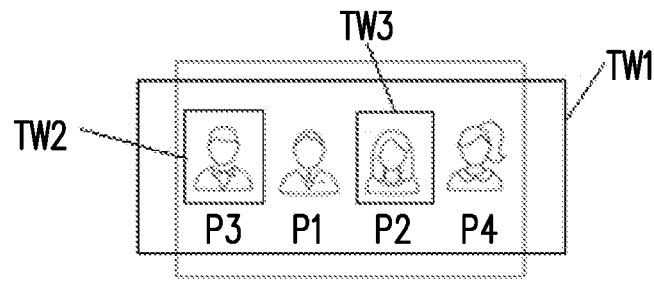
FIG. 7C is a schematic picture of a target layout in a mode according to an embodiment of the disclosure.
Figure 7C:
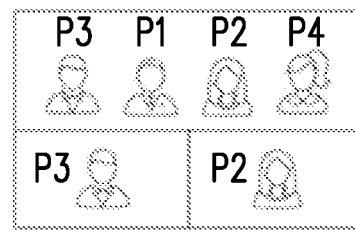

FIG. 7C is a schematic picture of a target layout in a mode according to an embodiment of the disclosure. With reference to FIG. 4, FIG. 6, and FIG. 7C, assuming that the first controller 30 selects the mode M11 in FIG. 6, the first image FIM2 in FIG. 4 may be converted into a second image SIM18 in FIG. 7C. The second image SIM18 is, for example, a three-way split window. The window TW1 is for the four figures P1, P2, P3, and P4, the window TW2 is for the figure P3, and the window TW3 is for the figure P2.

With reference to FIG. 2 again, the second controller 50 of this embodiment may detect one or more target objects in the second image to generate a detected result (step S250).

To be specific, the second controller 50 may obtain the second image converted by the first controller 30 via the USB and/or I2C interface.

In an embodiment, the second controller 50 may perform object detection on the second image. The object detection is to determine a bounding box or a representative point (pinot) (which may be located on the outline, center, or any position on the target object) corresponding to the target object (an object of, for example, a human, an animal, a non-living body, or its part) in the second image, and then to identify the type of the target object (e.g., human, male or female, dog or cat, table or chair, etc.). The detected result includes the bounding box (or the representative point) of the target object and/or the type of the target. The object detection described in the disclosure may also be to determine a region of interest (ROI) or a bounding rectangle corresponding to the target object in the second image, which is not limited herein.

In an embodiment, the second controller 50 may be applied to, for example, a neural network based algorithm (e.g., YOLO, region based convolutional neural network (R-CNN), or fast R-CNN (fast CNN)) or a feature matching based algorithm (e.g., histogram of oriented gradient (HOG), Harr, or speeded up robust feature (SURF)) to achieve object detection.

It should be noted that the algorithm used for object detection is not particularly limited in the embodiments of the disclosure. Besides, in some embodiments, the second controller 50 may specify a specific type of target object.

In an embodiment, the second controller 50 determines the position of the target object in the second image. That is, the detected result includes the position of the target object. For instance, whether the target object is in the middle of the second image. For another instance, whether the target object appears in the second image. In some embodiments, the second controller 50 may define a reference axis (e.g., a horizontal axis or a vertical axis) in the second image and determines an angle of the object relative to the reference axis in the second image.

In an embodiment, the second controller 50 may also determine whether the target object in the second image is moving. That is, the detected result includes the motion of the target object. For instance, the second controller 50 may determine the relationship and change of the positions or postures of the same target object in the frames of the front and rear images in the consecutive second images through object tracking. The consecutive second images represent those consecutive image frames of a video or video stream. The object tracking is to determine the correlation of, for example, the positions, movement, directions, and other motions of the same target object in adjacent second images (the position may be determined by a bounding box or a representative point), and then to locate the moving target object. In an embodiment, the second controller 50 may implement object tracking by applying, for example, optical flow, simple online and realtime tracking (SORT), deep SORT, a joint detection and embedding (JDE) model, or other tracking algorithms. It should be noted that the algorithm used for object tracking is not particularly limited in the embodiments of the disclosure.

As described above, in a preferred embodiment, the second controller 50 may determine the relationship and change of the positions or postures of the same target object in the frames of the front and rear images in the consecutive second images through object tracking. Preferably, in the second image detected by the second controller 50, when the detected result generated by the target object is that the target object in the second image does not move, the converting operation of dewarping and expanding may be performed only for the target object at the corresponding position of the bounding box, the ROI, or the bounding rectangle in this embodiment, so that the target object in the bounding box, for example, has a better ratio or a normal ratio of the target object image. In other words, when the detected result is that a position of the at least one target object in the second image is not changed, a converting operation such as dewarping and expanding may not be required for the entire image in this embodiment, and the deformation of the range corresponding to the position in the first image is required to be corrected only, and the efficiency of image processing is thereby improved.

On the other hand, in the frames (or bounding boxes) of the front and rear images in the consecutive second images, when the positions or postures of the same object change, the detected result generated by the second controller 50 detecting the target object in the second image is the movement of the target object in the second image. In this embodiment, the converting operation is corrected based on the detected result, so that the entire image undergoes a converting operation such as dewarping and expanding, and the target object is then detected again.

In an embodiment, the second controller 50 determines the integrity of the target object in the second image. That is, the detected result includes the integrity of the target object. For instance, the second controller 50 may identify key points (e.g., eyes, nose, or mouth) of the target object in the second image and confirm whether the parts corresponding to these key points are complete or the number is correct.

It should be noted that, in some embodiments, the first controller 30 also detects one or more target objects in the second image to generate the detected result. For instance, the first controller 30 performs object detection, object tracking, or integrity detection on the second image, and the same or similar contents may be found with reference to the abovementioned description and is not repeated herein.

The first controller 30 may correct the converting operation according to the detected result (step S270). To be specific, the target object and/or the image capturing apparatus 10 may change positions. If the converting operation remains unchanged, the position of the target object in the second image may not be centered or a portion of the target object may be cropped and become incomplete, the viewing experience is thereby affected. In an embodiment, the second controller 50 may return the detected result to the first controller 30 and determines whether the converting operation needs to be adjusted accordingly.

In an embodiment, the position of the target object in the detected result is in a bounding box format. The bounding box format includes the coordinates of the horizontal axis and vertical axis of the bounding box in the second image and the size (e.g., width and height) of the second image.

In another embodiment, the position of the target object in the detected result is in a representative point format. The representative point format includes the coordinates of the horizontal axis and the vertical axis of the representative point in the second image and the zoom magnification.

Figure 8:
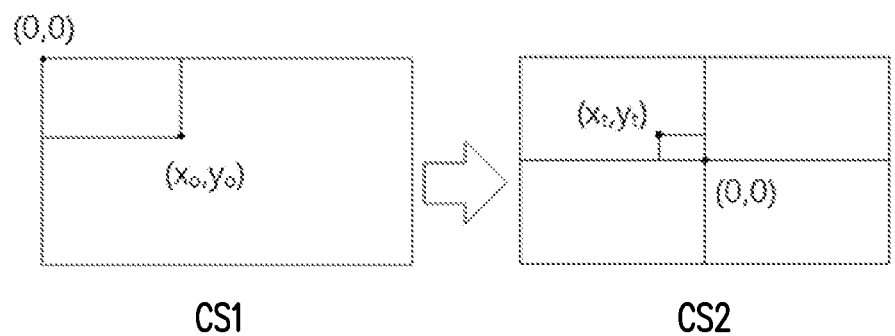
FIG. 8 is a schematic diagram of coordinate system conversion in a mode according to an embodiment of the disclosure.

In an embodiment, the coordinate systems defined by the first controller 30 and the second controller 50 for the second image may be different. FIG. 8 is a schematic diagram of coordinate system conversion in a mode according to an embodiment of the disclosure. With reference to FIG. 8, the second controller 50 positions pixels in the second image using a coordinate system CS1 such as image coordinates. In the coordinate system CS1, the upper left corner is an origin.

The first controller 30 positions the pixels in the second image in a coordinate system CS2 (e.g., polar coordinate system). In the coordinate system CS2, the center point is the origin. In other preferred embodiments, either the first controller 30 or the second controller 50 may position the pixels in the second image in an appropriate coordinate system, which is not limited herein.

If the detected result includes the target position of the fourth target among the targets in the second image, the first controller 30 or the second controller 50 may convert the coordinates $(x_o, y_o)$ of the target position of the fourth target from the coordinate system CS1 to the coordinates $(x_t, y_t)$ of the coordinate system CS2, and the conversion formula is as follows:

$$x_t = x_o - w/2 \quad (1) \text{ and}$$

$$y_t = y_o - h/2 \quad (2),$$

where $x_o$ is the coordinate of the fourth target on the horizontal axis in the coordinate system CS1, $x_t$ is the coordinate of the fourth target on the horizontal axis in the coordinate system CS2, $y_o$ is the coordinate of the fourth object on the vertical axis in the coordinate system CS1, $y_t$ is the coordinate of the fourth object on the vertical axis in the coordinate system CS2, w is the width of the second image, and h is the height of the second image.

It should be noted that if the first controller 30 and the second controller 50 use the same coordinate system, the coordinate conversion may be ignored.

Figure 9:
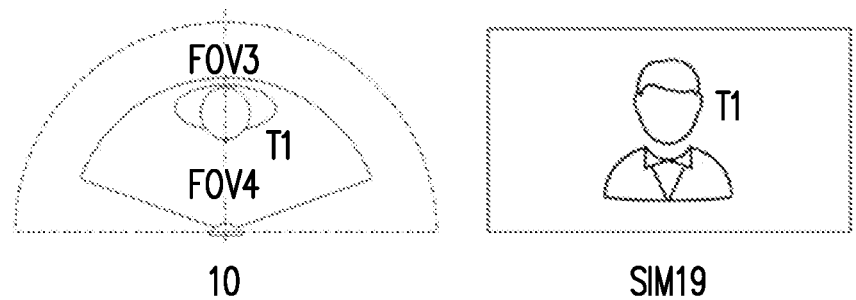
FIG. 9 is a schematic picture of a second image under a FoV according to an embodiment of the disclosure.

It is worth noting that the target object may not be centered in the second image or the window of the second image. For instance, FIG. 9 is a schematic picture of a second image SIM19 under an imaging FoV FOV3 according to an embodiment of the disclosure. With reference to FIG. 9, it is assumed that a maximum FoV FOV4 of the image capturing apparatus 10 is 180 degrees. That is, the first image includes a 180-degree field of view. Th FoV FOV3 set by the converting operation is 140 degrees. It is assumed that an imaginary line extending directly forwards from the position of the image capturing apparatus 10 is the reference axis (i.e., the vertical center line of the imaging FoV FOV3). A target object T1 is located directly in front of the image capturing apparatus 10, that is, an offset angle relative to the reference axis is zero. Therefore, the target object T1 is located in the middle of the second image SIM19.

Figure 10:
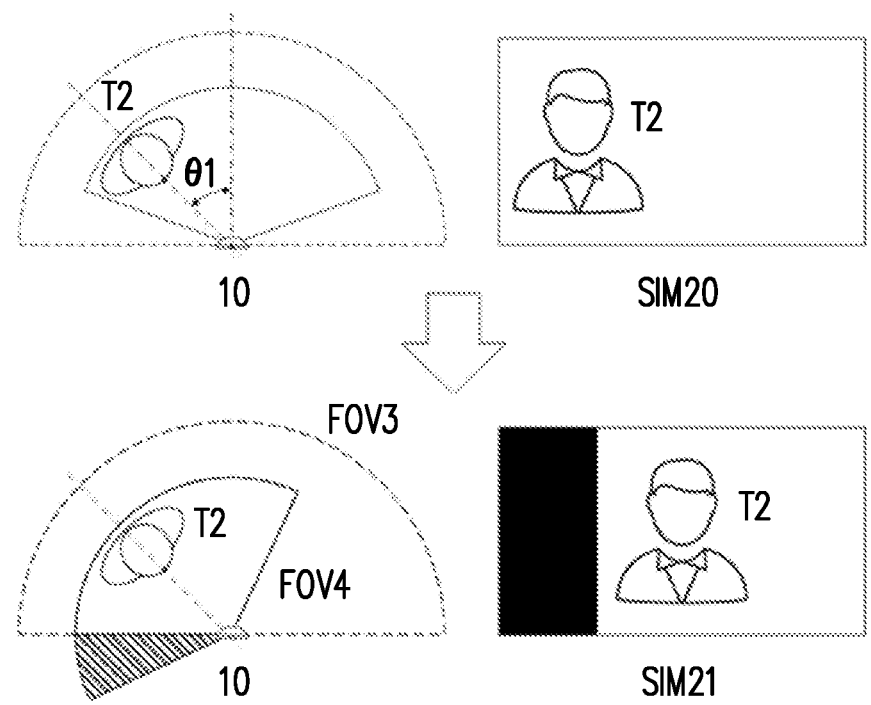
FIG. 10 is a schematic picture of a second image under a rotated FoV according to an embodiment of the disclosure.

FIG. 10 is a schematic picture of a second image SIM20 under a rotated FoV according to an embodiment of the disclosure. With reference to FIG. 10, different from FIG. 9, the offset angle of the target object T2 relative to the reference axis is 01 (e.g., 45 degrees). Therefore, the target object T2 is located to the left of the second image SIM20.

In an embodiment, the first controller 30 may center and align the target object according to the offset angle. The detected result includes the offset angle of the first target among these target objects relative to the reference axis in the second image. The reference axis is the horizontal or vertical center line of the original imaging FoV of the second image. The first controller 30 may set the converting operation to rotate the imaging FoV of the first image according to the offset angle to reduce the offset angle. For instance, the FoV rotation includes the upper and lower FoV adjustment shown in FIG. 3E, the left and right FoV adjustment shown in FIG. 3F, and the plane FoV adjustment shown in FIG. 3G.

In an embodiment, the first controller 30 may convert coordinates of the second image according to the ratio of the imaging FoV of the first image to the length of the first image (e.g., its width or height) in the axial direction corresponding to the direction of rotating a first imaging FoV of the first image. If the coordinate system CS2 in FIG. 6 is used, the rotation of the imaging FoV in different axial directions are:

$$\text{Pan}(x_t) = x_t \times \text{fov}_H / w \quad (3)$$

$$\text{Tilt}(y_t) = y_t \times \text{fov}_v / h \quad (4), \text{ and}$$

$$\text{Rotate}(x_t) = x_t \times \text{fov}_H / w \quad (5),$$

where $\text{fov}_H$ is the imaging FoV of the second image in the horizontal direction, and $\text{fov}_v$ is the imaging FoV of the second image in the vertical direction. Pan( ) is a function for the upper and lower imaging FoV adjustment. For instance, the direction of left and right rotation corresponds to the x axis, so it is for the imaging FoV in the horizontal direction and the width of the second image. Tilt( ) is a function for the left and right imaging FoV adjustment. For instance, the direction of upper and lower rotation corresponds to the y axis, so it is for the imaging FoV in the vertical direction and the height of the second image. Tilt( ) is a function for the plane imaging FoV adjustment. As shown in FIG. 3J, the outer ring images IMo1 and IMo2 respectively exhibit left-shift and right-shift effects, so it is for the imaging FoV in the horizontal direction and the width of the second image.

In an embodiment, the detected result includes that the rotated imaging FoV of the second image exceeds the (maximum) FoV of the image capturing apparatus 10. Taking FIG. 10 as an example, after the imaging FoV FOV4 of a second image SIM21 is rotated, the left boundary thereof exceeds the maximum imaging FoV FOV3 of the image capturing apparatus 10. Therefore, even if the target object T2 is located in the middle of the second image SIM21, a black region is generated on the left side of the second image SIM21 because a visible image cannot be obtained.

The first controller 30 may set a portion of the rotated imaging FoV of the second image (hereinafter referred to as the first imaging FoV) exceeding the imaging FoV of the image capturing apparatus 10 (hereinafter referred to as the second imaging FoV) to be limited to an edge of the second imaging FoV. For instance, if the coordinate system CS2 in FIG. 8 is used, the edge correction of the imaging FoV is as follows:

If the coordinate $x_{t2}$ of the horizontal axis of the rotated imaging FoV is between the left edge and the right edge of the second FoV, the coordinate $x_{t2}$ does not change.

If the coordinate $x_{t2}$ of the horizontal axis of the rotated FoV is smaller than the coordinate of the left edge of the second FoV, the coordinate $x_{t2}$ is corrected to the coordinate of the left edge of the second FoV.

If the coordinate $x_{t2}$ of the horizontal axis of the rotated FoV is greater than the coordinate of the right edge of the second FoV, the coordinate $x_{t2}$ is corrected to the coordinate of the right edge of the second FoV.

If the coordinate $y_{t2}$ of the vertical axis of the rotated imaging FoV is between the upper edge and the lower edge of the second FoV, the coordinate $y_{t2}$ does not change.

If the coordinate $y_{t2}$ of the vertical axis of the rotated FoV is smaller than the coordinate of the lower edge of the second FoV, the coordinate $y_{t2}$ is corrected to the coordinate of the lower edge of the second FoV.

If the coordinate $y_{t2}$ of the vertical axis of the rotated FoV is greater than the coordinate of the upper edge of the second FoV, the coordinate $y_{t2}$ is corrected to the coordinate of the upper edge of the second FoV.

Figure 11:
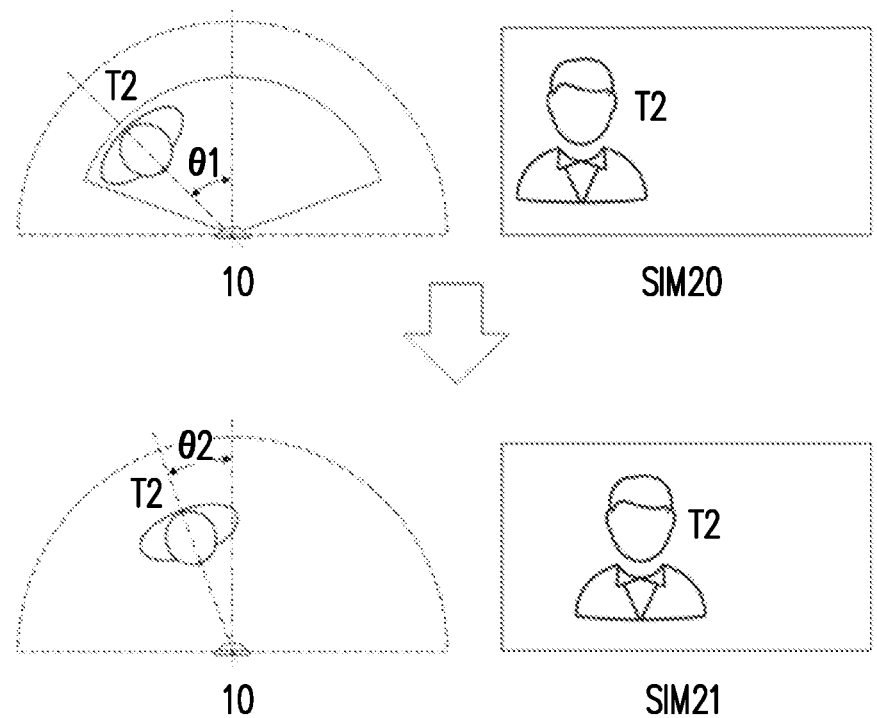
FIG. 11 is a schematic picture of corrected second images according to an embodiment of the disclosure.

For instance, FIG. 11 is a schematic picture of corrected second images SIM20 and SIM22 according to an embodiment of the disclosure. The difference between FIG. 11 and FIG. 10 is that the first FoV of the second image SIM22 is corrected, so the target object T2 is close to the middle of the second image (e.g., an angle θ2 is 20 degrees).

Figure 12A:
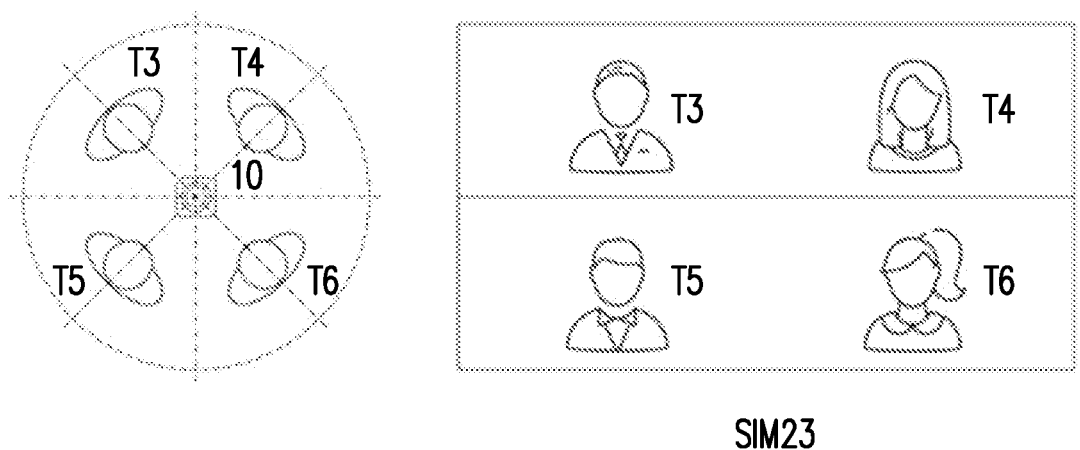
FIG. 12A is a schematic picture of a second image of a conference scenario according to an embodiment of the disclosure.

FIG. 12A is a schematic picture of a second image SIM23 of a conference scenario according to an embodiment of the disclosure. With reference to FIG. 12A, in the application scenario of a conference mode, it is assumed that the lens 10 is a fisheye lens and may obtain the first image of 360 degrees, and images are stitched together in a manner of 180 degrees up and down. Since the targets T3 and T4 are located within the upper 180-degree FoV, and the targets T5 and T6 are located within the lower 180-degree FoV, the targets T3 to T6 are located at appropriate positions in the second image.

Figure 12B:
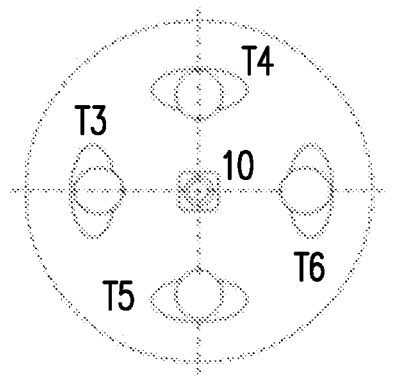
FIG. 12B is a schematic picture of a second image of the conference scenario according to another embodiment of the disclosure.
Figure 12B:
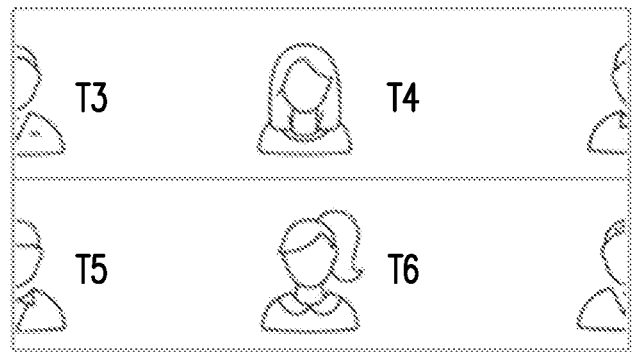

FIG. 12B is a schematic picture of a second image SIM24 of the conference scenario according to another embodiment of the disclosure. The difference between FIG. 12B and FIG. 12A is that the targets T3 to T6 of this embodiment are located at non-ideal positions or are in a moving state. Therefore, portions of the targets T3 and T5 in the second image SIM24 are cropped (i.e., incomplete).

Figure 12C:
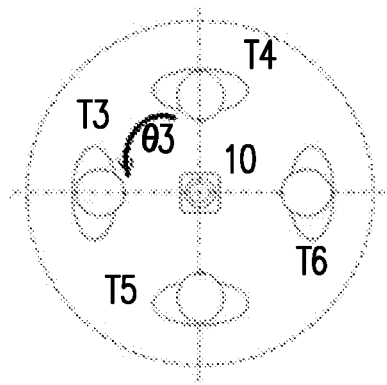
FIG. 12C is a schematic picture of a corrected second image according to another embodiment of the disclosure.
Figure 12C:
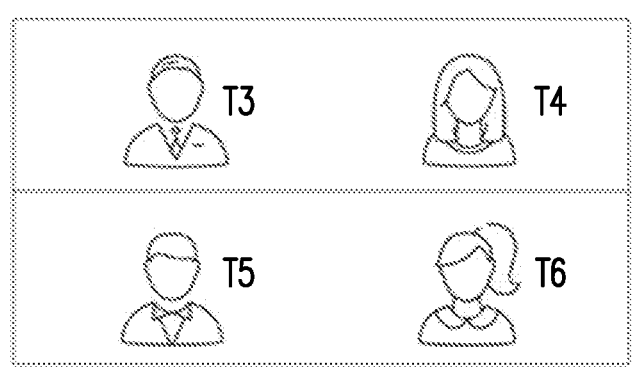

FIG. 12C is a schematic picture of a corrected second image SIM25 according to another embodiment of the disclosure. With reference to FIG. 12C, if the detected result of the second controller 50 is the integrity of the target object, after determining the integrity of the target object, the first controller 30 may be triggered to rotate the imaging FoV (e.g., a rotation angle θ3) of the first image. Therefore, compared to FIG. 12B, the targets T3 to T6 may be completely presented in the second image SIM25.

In an embodiment, the detected result includes a size ratio of the second target among the target object in the second image. In the image processing system provided by this embodiment, the converting operation may be set to change the zoom magnification of all or part of the second image according to the size ratio, so as to maintain the proportion of the second target object in the second image. Taking FIG. 6 as an example, the size of the second target in the window TW1 in the mode M1 may be greater than the size of the second target in the window TW1 in the mode M15, and the visual experience is improved in this way.

In an embodiment, if the detected result is to position the second target with the bounding box, in the image processing system of this embodiment, the zoom magnification may be set to be a smallest one among the width ratio, the height ratio, and the maximum ratio. The size ratio includes the height ratio and the width ratio. The width ratio is the ratio of the width of the second image to the width of the bounding box of the second target, and the height ratio is the ratio of the height of the second image to the height of the bounding box.

In another embodiment, if the detected result is to position the second target with the representative point, in the image processing system of this embodiment, the zoom magnification may be set to be a reference magnification. That is, the second target is directly zoomed in at the designated reference magnification.

In an embodiment, the converting operation for target layout is provided. In the image processing system of this embodiment, the target window is determined according to the bounding box or the representative point in the original window. In the image processing system of this embodiment, the reference axis for evaluating the offset may be set as the central axis of the bounding box of the third target among the plurality of target objects or the extension line of the representative point, and the first FoV is rotated to align the third target with the object window. That is, the center of the FoV is directed towards the third target. The FoV in functions (3) to (4) may be replaced with the FoV for the target window. In addition, if the rotated FoV exceeds the bounding box, the first controller 30 may correct the FoV used for cropping the image and limits the exceeding portion of the FoV to the edge of the bounding box.

In an embodiment, in the image processing system, the size ratio of the target window of the third target in the second image may be determined, and the converting operation may be set according to the size ratio to change the zoom magnification of the third target. For instance, in the image processing system, the zoom magnification may be set to be the smallest one among the second width ratio, the second height ratio, and the maximum ratio. The size ratio includes the second height ratio and the second width ratio. The second width ratio is the ratio of the width of the target window to the width of the bounding box of the third target, and the second height ratio is the ratio of the height of the target window to the height of the bounding box.

Figure 13:
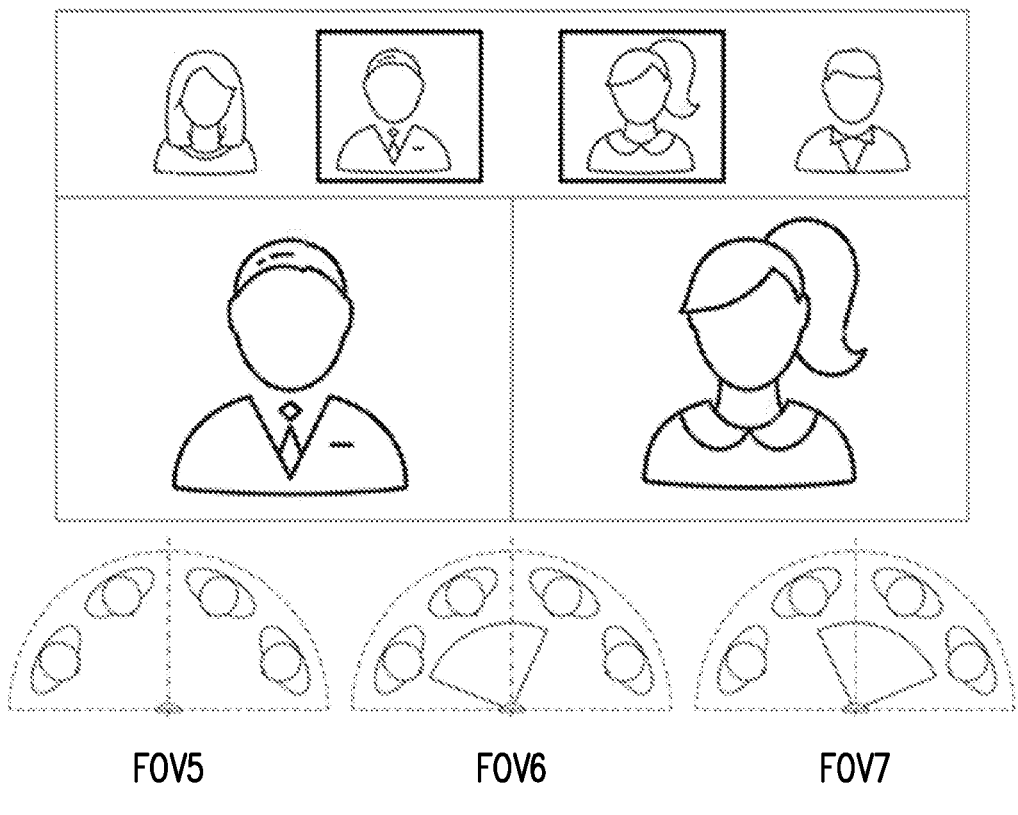
FIG. 13 is a schematic picture of a multi-target window image according to an embodiment of the disclosure.

For instance, FIG. 13 is a schematic picture of a multi-target window image according to an embodiment of the disclosure. With reference to FIG. 13, taking the mode M11 of FIG. 6 as an example, the window TW1 is the original window, and the windows TW2 and TW3 are the target windows. The original window is the image within a maximum FoV FOV5 of the image capturing apparatus 10 or the predetermined FoV of the second image in the single-window mode. The other two target windows are the images in the FoV FOV6 and the FoV FOV7. The second controller 50 obtains the bounding boxes BB1 and BB2 according to the detected results and respectively arranges the images in the two BB1 and BB2 in the windows TW2 and TW3. Compared to the FoV FOV5, the FoV FOV6 and the FoV FOV7 are rotated and their left and right boundaries are the left and right boundaries of the bounding boxes BB1 and BB2. Therefore, the face in each target window may be automatically centered, and the face in the target window may be automatically scaled to an appropriate size. Besides, if the human face in the target window moves, the human face may still be centered on the target window according to the detected result of the second controller 50 and the size of the human face may be maintained in this embodiment.

Figure 14A:
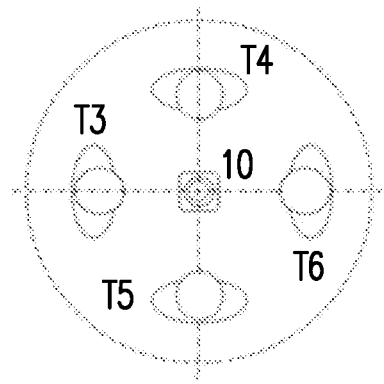
FIG. 14A is a schematic picture of a second image of a multi-target window image according to an embodiment of the disclosure.
Figure 14A:
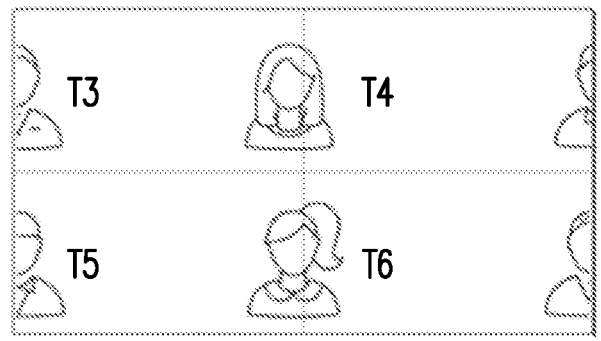

FIG. 14A is a schematic picture of a second image SIM27 of a multi-target window image according to an embodiment of the disclosure. With reference to FIG. 14A, taking the mode M4 of FIG. 6 as an example, before the converting operation is not corrected, the faces of the target objects T3 to T6 in the second image SIM27 are all cut by the window, resulting in poor visual experience.

Figure 14B:
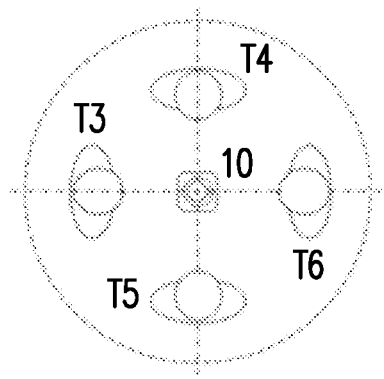
FIG. 14B is a schematic picture of a corrected second image according to an embodiment of the disclosure.
Figure 14B:
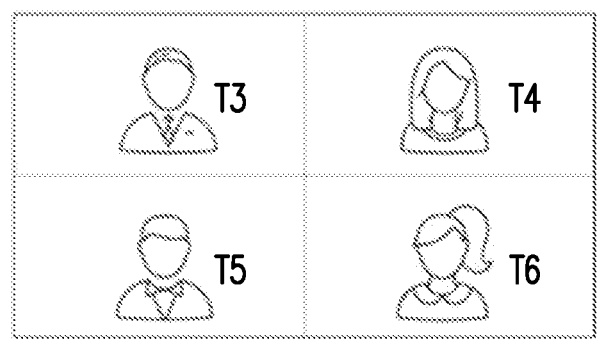

FIG. 14B is a schematic picture of a corrected second image SIM28 according to an embodiment of the disclosure. With reference to FIG. 14B, the first controller 30 may obtain that the target objects T3 to T6 deviate from the center of the window according to the detected result and corrects the converting operation accordingly. Compared to FIG. 14A, after the correcting and converting operation, the faces of the target objects T3 to T6 in the second image SIM28 are all centered on the target window, and the second image SIM28 presents a face of a suitable size, so that improved visual experience is provided. Besides, regardless of any position or movement of the target objects T3 to T6 in the conference room, the second image SIM28 may present an appropriate four-way split screen (i.e., the face remains centered and the size of the face is the same).

In view of the foregoing, in the image controller, the image processing system, and the image correcting method provided by the embodiments of the disclosure, the converting operation related to deformation correction and/or target layout is corrected based on the detected result of the image recognition. Herein, in the embodiments of the disclosure, the FoV may be directed towards the target object, and the size of the target object in the image may also be changed. In this way, the target object may be automatically placed in the image or in the designated target window, the size of the target object in the image may be automatically adjusted, and improved visual experience is thereby provided. Even if the target object moves, the centering and size of the target object may still be maintained through the detected result and operation correction.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image correcting method, comprising:
obtaining, through a first controller, a first image from an image capturing apparatus;
converting, through the first controller, the first image into a second image according to a converting operation, wherein the converting operation comprises at least one deformation correction, and the deformation correction is used to correct deformation of at least one target object in the first image;
detecting, through a second controller, the at least one target object in the second image to generate a detected result; and
correcting, through the first controller, the converting operation according to the detected result, comprising:
allowing the converting operation to further comprise position adjustment to adjust a position of the at least one target object in the second image, wherein the position adjustment comprises a field of view (FoV) adjustment; and
correcting an image FoV of the FoV adjustment on the first image, wherein the detected result comprises an offset angle of a first target among the at least one target object relative to a reference axis in the second image, and the position adjustment further comprises:
setting the converting operation to rotate a first imaging field of view (FoV) of the first image according to the offset angle to reduce the offset angle.

2. The image correcting method according to claim 1, wherein the converting operation further comprises a target layout, the second image comprises a plurality of windows, the target layout is used to adjust a target window of the first target in the second image, the target window is one of the windows, and the step of setting the converting operation to rotate the first imaging field of view of the first image according to the offset angle to reduce the offset angle further comprises:
rotating the first imaging field of view to align the first target with the target window.

3. The image correcting method according to claim 2, wherein the detected result comprises a size ratio of a third target among the at least one target object in a target window in the second image, the target window is one of the windows, and the step of correcting the converting operation according to the detected result comprises:
setting the converting operation to change a zoom magnification of the third target according to the size ratio.

4. The image correcting method according to claim 2, wherein the detected result comprises that a position of the at least one target object in the second image is not changed, and the distortion correction only corrects deformation of a range corresponding to the position in the first image.

5. The image correcting method according to claim 1, wherein the detected result comprises that the rotated first imaging field of view exceeds a second imaging field of view of the image capturing apparatus, and the position adjustment further comprises:
setting a portion of the rotated first imaging field of view exceeding the second imaging field of view to be limited to an edge of the second imaging field of view.

6. The image correcting method according to claim 1, wherein the step of setting the converting operation to rotate the first imaging field of view of the first image according to the offset angle to reduce the offset angle further comprises:
converting coordinates of the first image according to a ratio of the first imaging field of view to a length of the first image in an axial direction corresponding to a direction of rotating the first imaging field of view.

7. The image correcting method according to claim 1, wherein the detected result comprises a size ratio of a second target among the at least one target object in the second image, and the converting operation is set to change a zoom magnification of the first image to the second image according to the size ratio.

8. The image correcting method according to claim 7, wherein the step of setting the converting operation to change the zoom magnification of the first image to the second image according to the size ratio comprises:
setting the zoom magnification to be a smallest one among a width ratio, a height ratio, and a maximum ratio, wherein the second target is positioned with a bounding box, the size ratio comprises the height ratio and the width ratio, the width ratio is a ratio of a width of the second image to a width of the bounding box of the second target, and the height ratio is a ratio of a height of the second image to a height of the bounding box.

9. The image correcting method according to claim 7, wherein the step of setting the converting operation to change the zoom magnification of the first image to the second image according to the size ratio comprises:
setting the zoom magnification as a reference magnification, wherein the second target is positioned with a representative point.

10. The image correcting method according to claim 1, wherein the second controller positions pixels in the second image with a first coordinate system, the first controller positions the pixels in the second image with a second coordinate system, the detected result comprises a target position of a fourth target among the at least one target object in the second image, and the step of correcting the converting operation according to the detected result further comprises:
converting coordinates of the target position from the first coordinate system to coordinates of the second coordinate system, wherein a center point is treated as an origin in the second coordinate system, and an upper left corner is treated as an origin in the first coordinate system.

11. An image processing system, comprising:
- an image capturing apparatus, comprising a lens and an image sensor and configured to capture a first image through the lens and the image sensor;
- a first controller, coupled to the image capturing apparatus and configured to convert the first image into a second image according to a converting operation, wherein the converting operation comprises deformation correction, and the deformation correction is used to correct deformation of at least one target object in the first image; and
- a second controller, coupled to the first controller and configured to detect the at least one target object in the second image to generate a detected result, wherein the first controller is further configured to correct the converting operation according to the detected result, and correcting the converting operation performed by the first controller comprises:
  - allowing the converting operation to further comprise position adjustment to adjust a position of the at least one target object in the second image, wherein the position adjustment comprises a field of view (FoV) adjustment; and
  - correcting an image FoV of the FOV adjustment on the first image,
- wherein the detected result comprises an offset angle of a first target among the at least one target object relative to a reference axis in the second image, and the first controller is further configured for setting the converting operation to rotate a first imaging field of view of the first image according to the offset angle to reduce the offset angle.

12. The image processing system according to claim 11, wherein the detected result comprises that the rotated first imaging field of view exceeds a second imaging field of view of the image capturing apparatus, and the first controller is further configured for setting a portion of the rotated first imaging field of view exceeding the second imaging field of view to be limited to an edge of the second imaging field of view.

13. The image processing system according to claim 12, wherein the converting operation further comprises a target layout, the second image comprises a plurality of windows, the target layout is used to adjust a target window of the first target in the second image, the target window is one of the windows, and the first controller is further configured for:
- rotating the first imaging field of view to align the first target with the target window;
- wherein the detected result comprises that a position of the at least one target object in the second image is not changed, and the distortion correction only corrects deformation of a range corresponding to the position in the first image.

14. The image processing system according to claim 13, wherein the detected result comprises a size ratio of a third target among the at least one target object in a target window in the second image, the target window is one of the windows, and the first controller is further configured for:
- setting the converting operation to change a zoom magnification of the third target according to the size ratio.

15. The image processing system according to claim 12, wherein the first controller is further configured for:
- converting coordinates of the first image according to a ratio of the first imaging field of view to a length of the first image in an axial direction corresponding to a direction of rotating the first imaging field of view.

16. The image processing system according to claim 11, wherein the detected result comprises a size ratio of a second target among the at least one target object in the second image, and the converting operation is set to change a zoom magnification of the first image to the second image according to the size ratio;
- wherein the zoom magnification is set to be a smallest one among a width ratio, a height ratio, and a maximum ratio, the second target is positioned with a bounding box, the size ratio comprises the height ratio and the width ratio, the width ratio is a ratio of a width of the second image to a width of the bounding box of the second target, and the height ratio is a ratio of a height of the second image to a height of the bounding box;
- wherein the zoom magnification is set as a reference magnification, and the second target is positioned with a representative point.

17. The image processing system according to claim 11, wherein the second controller positions pixels in the second image with a first coordinate system, the first controller positions the pixels in the second image with a second coordinate system, the detected result comprises a target position of a fourth target among the at least one target object in the second image, and the first controller or the second controller is further configured for:
- converting coordinates of the target position from the first coordinate system to coordinates of the second coordinate system, wherein a center point is treated as an origin in the second coordinate system, and an upper left corner is treated as an origin in the first coordinate system.

18. An image controller, adapted to be coupled to an image capturing apparatus, wherein the image capturing apparatus comprises a lens and an image sensor, the image capturing apparatus captures a first image through the lens and the image sensor, and the image controller comprises:
- a memory, configured to store a program code; and
- a processor, coupled to the memory, configured to load and execute the program code for:
  - obtaining the first image,
  - converting the first image into a second image according to a converting operation, wherein the converting operation comprises distortion correction, and the distortion correction is used to correct deformation of at least one target object in the first image,
  - detecting the at least one target object in the second image to generate a detected result, and
  - correcting the converting operation according to the detected result, comprising:
    - allowing the converting operation to further comprise position adjustment to adjust a position of the at least one target object in the second image, wherein the position adjustment comprises a field of view (FoV) adjustment; and
    - correcting an image FoV of the FOV adjustment on the first image, wherein the detected result comprises an offset angle of a first target among the at least one target object relative to a reference axis in the second image, and the image controller sets the converting operation to rotate a first imaging field of view of the first image according to the offset angle to reduce the offset angle.

19. The image controller according to claim 18, wherein the detected result comprises that the rotated first imaging field of view exceeds a second imaging field of view of the image capturing apparatus, and the image controller is further configured for setting a portion of the rotated first imaging field of view exceeding the second imaging field of view to be limited to an edge of the second imaging field of view.

20. The image controller according to claim 19, wherein the converting operation further comprises a target layout, the second image comprises a plurality of windows, the target layout is used to adjust a target window of the first target in the second image, the target window is one of the windows, and the image controller is further configured for:

rotating the first imaging field of view to align the first target with the target window, wherein the detected result comprises a size ratio of a third target among the at least one target object in a target window in the second image, the target window is one of the windows, and the image controller is further configured for:

setting the converting operation to change a zoom magnification of the third target according to the size ratio.

21. The image controller according to claim 19, wherein the image controller is further configured for: converting coordinates of the first image according to a ratio of the first imaging field of view to a length of the first image in an axial direction corresponding to a direction of rotating the first imaging field of view.

* * * * *